US012674353B1

(12) United States Patent
Pytlik

(10) Patent No.: US 12,674,353 B1
(45) Date of Patent: Jul. 7, 2026

(54) INTEGRATED HURRICANE SHUTTER, SCREEN AND GLASS RAILING SYSTEM

(71) Applicant: Clear Choice Group, Inc., Naples, FL (US)

(72) Inventor: Kenneth Brett Pytlik, Naples, FL (US)

(73) Assignee: Clear Choice Group, Inc., Naples, FL (US)

( * ) Notice: Subject to any disclaimer, the term of this patent is extended or adjusted under 35 U.S.C. 154(b) by 0 days.

(21) Appl. No.: 19/203,645

(22) Filed: May 9, 2025

(51) Int. Cl.
*E06B 9/58* (2006.01)
*E06B 9/17* (2006.01)
*E06B 9/54* (2006.01)
*E06B 9/00* (2006.01)

(52) U.S. Cl.
CPC ............ *E06B 9/17061* (2013.01); *E06B 9/54* (2013.01); *E06B 2009/005* (2013.01); *E06B 2009/587* (2013.01)

(58) Field of Classification Search
CPC .. E06B 2009/587; E06B 9/58; E06B 9/17061; E06B 2009/005; E06B 2009/405; E06B 2009/002; E06B 9/54; E06B 2009/2452; E06B 2009/2447
See application file for complete search history.

(56) References Cited

U.S. PATENT DOCUMENTS 4,237,956 A * 12/1980 Sivin ........................ F24S 20/63 160/241
2018/0179813 A1* 6/2018 Sperber ..................... E06B 9/40

FOREIGN PATENT DOCUMENTS

| | | | | | |
|---|---|---|---|---|---|
| DE | 3425832 | A1 * | 1/1986 | | |
| DE | 29519952 | U1 * | 4/1996 | | |
| DE | 19839332 | A1 * | 3/2000 | ............... | E06B 9/17 |
| EP | 0911479 | A2 * | 4/1999 | ............... | E06B 9/44 |
| EP | 1091081 | A2 * | 4/2001 | ............... | E06B 9/58 |

OTHER PUBLICATIONS

Machine translation EP1091091 (Year: 2001).*
Machine translation DE29519952 (Year: 1996).*
Machine translation DE19839332 (Year: 1998).*
Machine translation DE3425832 (Year: 1986).*

* cited by examiner

*Primary Examiner* — Johnnie A. Shablack
*Assistant Examiner* — Jeremy C Ramsey
(74) *Attorney, Agent, or Firm* — Mark Terry

(57) ABSTRACT

A retractable shutter and screen system for a balcony includes a horizontal box structure located adjacent to a ceiling of the balcony and containing a rollable shutter material and a rollable screen material, an assembly positioned at an outermost portion of the balcony underneath the horizontal box structure, wherein the assembly includes a vertically oriented support structure, a first vertical extrusion positioned inwardly behind the support structure and including a first vertical track to guide the shutter material as the shutter material is deployed downwardly from the horizontal box structure, a second vertical extrusion positioned inwardly behind the first vertical extrusion and including a second vertical track to guide the screen material as the screen material is deployed downwardly from the horizontal box structure, an enclosure panel positioned inwardly behind the second vertical extrusion, and brackets mounted inwardly behind the second vertical extrusion to engage and support the enclosure panel.

16 Claims, 17 Drawing Sheets

INTEGRATED HURRICANE SHUTTER, SCREEN AND GLASS RAILING SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to storm protection and screening systems, and more particularly to integrated shutter, screen, and glass panel assembly systems designed for balconies.

BACKGROUND

In many geographical regions, especially coastal areas, there is an increasing need to protect building structures, such as balconies, terraces, and similar outdoor spaces, against extreme weather events, including hurricanes and tropical storms. Typically, these structures utilize hurricane shutters designed to shield windows from projectiles and windborne debris. Traditional shutters are commonly mounted externally and are typically roll-down assemblies made from aluminum.

Conventional storm shutters generally require separate mounting systems and frameworks that are distinct from those used for other balcony features, such as screens, railings, and decorative glass enclosures. Consequently, building occupants are often compelled to install multiple independent systems to achieve protection against storms, insects, and environmental factors. The necessity of installing discrete structures for each functional element often results in increased installation complexity, higher overall costs, reduced aesthetic appeal, and greater difficulty of maintenance.

Existing shutter and screening systems frequently lack compatibility, making it challenging to seamlessly integrate insect screening solutions within the same spatial envelope as hurricane shutters and glass panel structures. Such incompatibility can create additional structural bulk, negatively impacting visual appeal and potentially obstructing scenic views and natural ventilation.

Further, existing shutter and screening systems are typically mounted within the balcony area, positioned behind the balcony railing and in front of doors or windows. Although this arrangement adequately protects the doors or windows from storm-related projectiles and windborne debris, it provides no protection to the railing or balcony panel itself, which in many contemporary architectural designs is fabricated from expensive glass panels or other high-value, aesthetically significant materials. Thus, during severe weather events such as hurricanes or strong storms, these unprotected balcony components are vulnerable to damage or complete destruction from flying debris and wind-driven projectiles. Such damage not only results in costly repairs or replacements but also creates significant safety hazards and can compromise the structural integrity of the balcony area.

Therefore, there remains a need in the art for a more unified and efficient structure capable of integrating hurricane protection shutters, insect screens, and balcony glazing systems within a common framework.

SUMMARY

A retractable shutter and screen system for a balcony is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a retractable shutter and screen system for a balcony is provided that solves the above-described problems. The retractable shutter and screen system for a balcony includes a horizontal box structure located adjacent to a ceiling of the balcony, said horizontal box structure containing a rollable shutter material and often a rollable screen material, a plurality of assemblies positioned at an outermost portion of a balcony underneath the horizontal box structure, wherein each assembly comprises, a vertically oriented support structure, a first vertical extrusion positioned inwardly behind the support structure, the first vertical extrusion comprising a first vertical track configured to receive and guide the shutter material as the shutter material is deployed downwardly from the horizontal box structure, a second vertical extrusion positioned inwardly with respect to the first vertical extrusion, the second vertical extrusion comprising a second vertical track configured to receive and guide the screen material as the screen material is deployed downwardly from the horizontal box structure, an enclosure panel positioned inwardly behind the second vertical extrusion, and one or more brackets mounted inwardly behind the second vertical extrusion, said brackets configured to engage and support the enclosure panel, such as a glass panel.

Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

DETAILED DESCRIPTION

Figure 1:
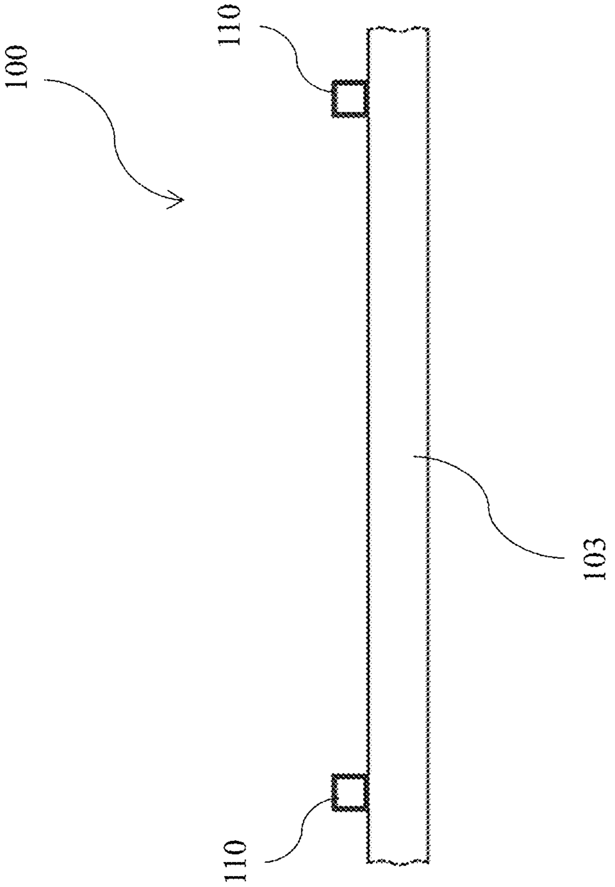
FIG. 1 is a top view of a retractable shutter and screen system for a balcony, according to an embodiment.

The following detailed description refers to the accompanying drawings. Wherever possible, the same reference numbers are used in the drawings and the following description to refer to the same or similar elements. While embodiments of the claimed subject matter may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The embodiments described and claimed herein significantly improve over prior art balcony protection systems by providing integrated and comprehensive protection for all balcony elements, including railings, decorative components, screens, and wall panels. Unlike conventional shutter installations, which typically only shield doors and windows while leaving outer balcony structures, such as glass railings or decorative glass panels, vulnerable to damage from storm-driven projectiles, the presently described invention positions protective shutters outwardly, near the outermost boundary of the balcony. This configuration ensures that expensive and structurally significant balcony components, including glass railings or glass wall panels, are protected during hurricanes or severe weather events.

Moreover, the claimed embodiments integrate multiple functional components-storm shutters, insect screens, and glass wall panels-into a compact and efficient arrangement utilizing a single, modular vertical extrusion assembly. Prior systems frequently required separate installation frameworks for shutters, screens, and glass components, leading to increased installation complexity, higher costs, bulkier structural arrangements, and compromised aesthetic appeal. In contrast, the claimed embodiments' integrated track system and vertical extrusions significantly reduce structural complexity, lower installation, and maintenance expenses, and improve the aesthetic integration of the balcony protection components into the overall architecture of the building.

Additionally, the inventive arrangement of first and second vertical extrusions placed inwardly behind support structures enables a space-saving deployment of shutters and screens, while also facilitating convenient mounting of glass panels through interiorly positioned brackets. This strategic positioning results in a streamlined structural envelope, maximizing usable balcony space and providing unobstructed views when shutters and screens are retracted. Thus, the claimed embodiments effectively address and overcome the deficiencies inherent in prior art systems by providing enhanced protective functionality, reduced cost, improved structural integration, and superior aesthetics.

The accompanying drawings, which are incorporated in and constitute a part of this disclosure, illustrate various example embodiments. The claimed retractable shutter and screen system 100 for a balcony will now be described with respect to FIGS. 1 through 17.

FIG. 1 is a top view of the retractable shutter and screen system 100, showing the horizontal box structure 103 positioned adjacent to the balcony ceiling. The box structure 103 stores the rollable shutter and screen materials and extends horizontally above assemblies comprising vertical extrusions and structural supports. Also shown are two support structures 110 spaced evenly apart.

Figure 2:
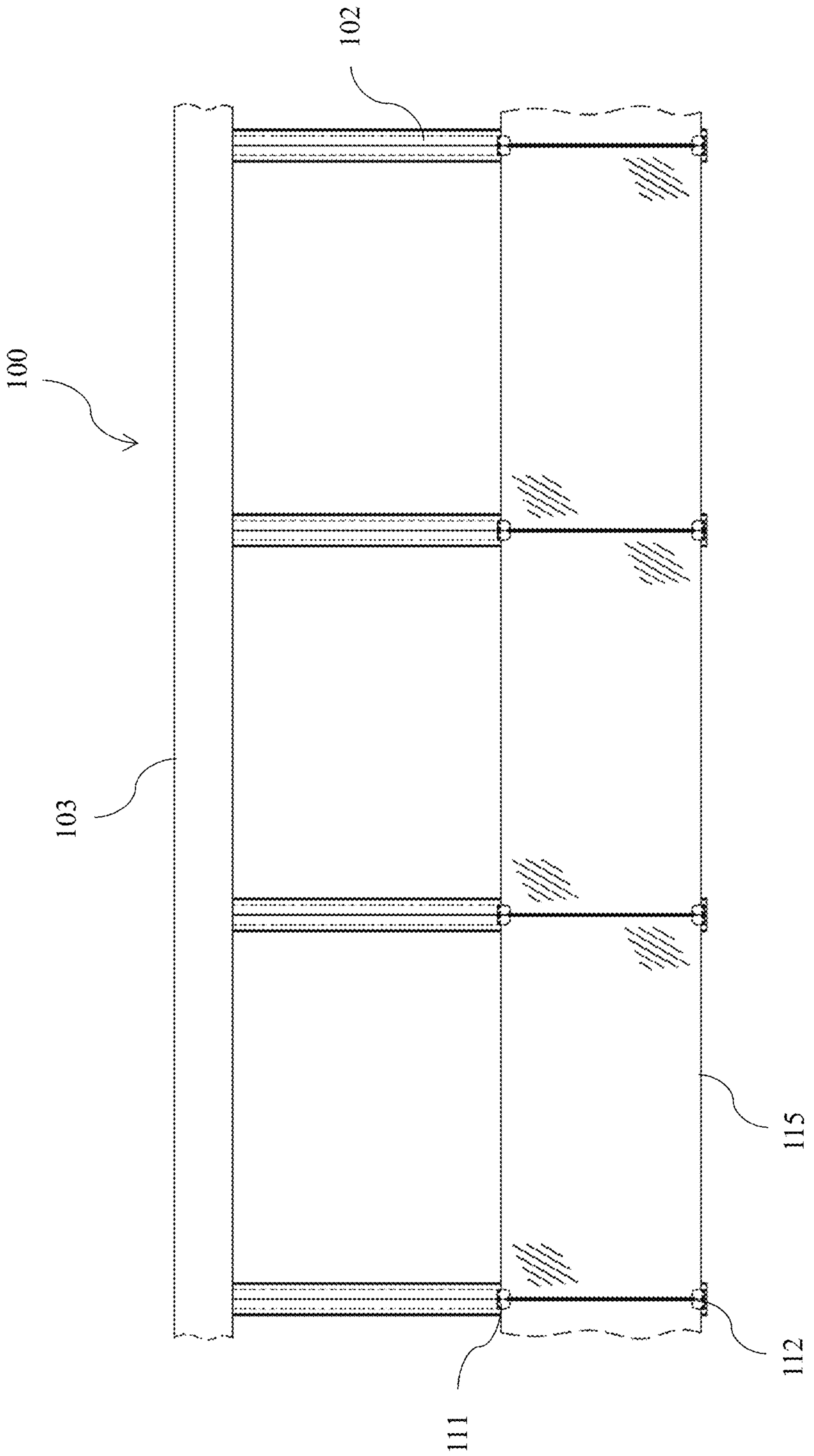
FIG. 2 is view of the retractable shutter and screen system from the interior of the balcony, according to an embodiment.

FIG. 2 illustrates the retractable shutter and screen system 100 viewed from the interior side of the balcony. It shows the vertically oriented second extrusions 102, positioned periodically along the balcony behind structural supports. Also shown is the horizontal box structure 103 positioned adjacent to the balcony ceiling and glass panels 115 supported by top and bottom brackets (111, 112).

Figure 3:
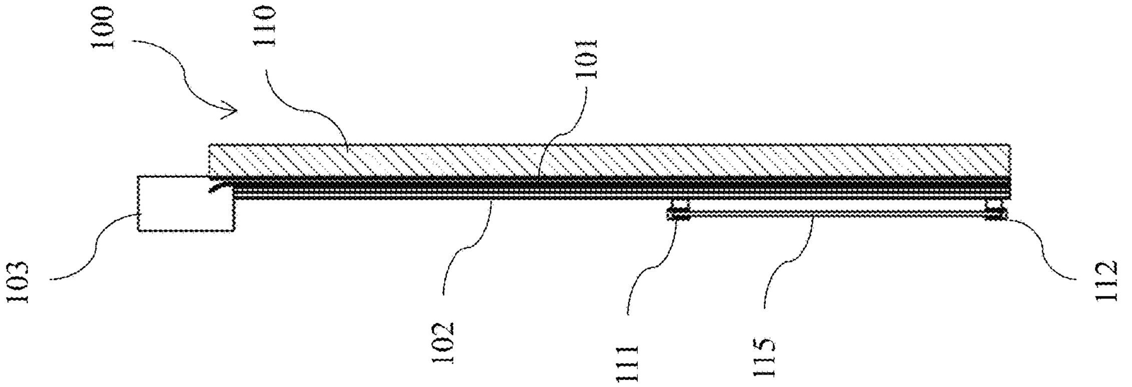
FIG. 3 is a side cross-sectional view of the retractable shutter and screen system for a balcony, according to an embodiment.

FIG. 3 is a side cross-sectional view of the retractable shutter and screen system 100 showing the vertical arrangement and positional relationship among the box structure 103, the structural support 110, first vertical extrusion 101, second vertical extrusion 102, and the glass panel 115 secured by top bracket 111 and bottom bracket 112. This figure also illustrates the relative positioning of the shutter material (located within box 103) that may be deployed along the extrusion 101 and screen material (located within box 103) along the extrusion 102.

Figure 4:
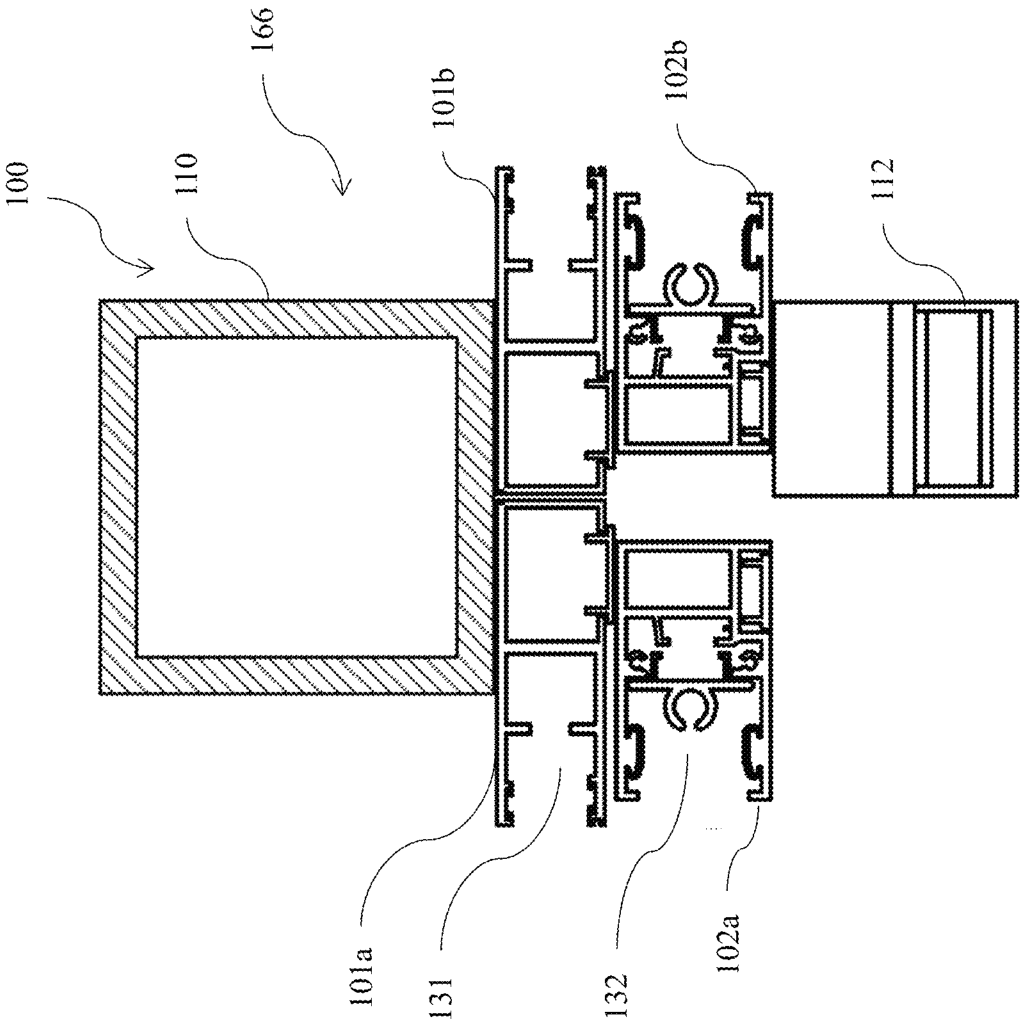
FIG. 4 is a top cross-sectional view of the retractable shutter and screen system for a balcony, according to an embodiment.

FIG. 4 is a top cross-sectional view of the retractable shutter and screen system 100 showing an assembly 166 comprising the structural support 110, the first vertical extrusions 101*a*, 101*b* for shutter material deployment, second vertical extrusions 102*a*, 102*b* for screen material deployment, and the bracket 112 for the glass panel. The tracks 131 and 132 are visible within their respective extrusions 101 and 102.

FIG. 4 shows a first instance of the vertical extrusion 101*a* positioned inwardly behind and to the left of the support structure 110, the extrusion 101*a* comprising a first vertical track 131 oriented in a first direction (towards the left) to receive and guide the shutter material as the shutter material is deployed downwardly from the horizontal box structure. FIG. 4 also shows a second instance of the vertical extrusion 101*b* positioned inwardly behind and to the right of the support structure 110 and adjacent to the first instance 101*a*, the second instance comprising a first vertical track 131 oriented in an opposite direction (towards the right) facing away from the first instance, such that the first and second instances 101*a*, 101*b* are arranged back-to-back.

FIG. 4 also shows a first instance of a vertical extrusion 102*a* positioned inwardly behind and to the left of the vertical extrusions 101*a*, 101*b*, the vertical extrusion 102*a* comprising a second vertical track 132 oriented in a first direction (towards the left) to receive and guide the screen material as the screen material is deployed downwardly from the horizontal box structure. FIG. 4 further shows a second instance of the vertical extrusion 102*b* positioned inwardly and to the right behind the vertical extrusions 101*a*, 101*b* and adjacent to the first instance 102*a*, the second instance 102*b* comprising a second vertical track 132 oriented in an opposite direction facing away from the first instance 102*a*, such that the first and second instances 102*a*, 102*b* are arranged back-to-back.

Figure 5:
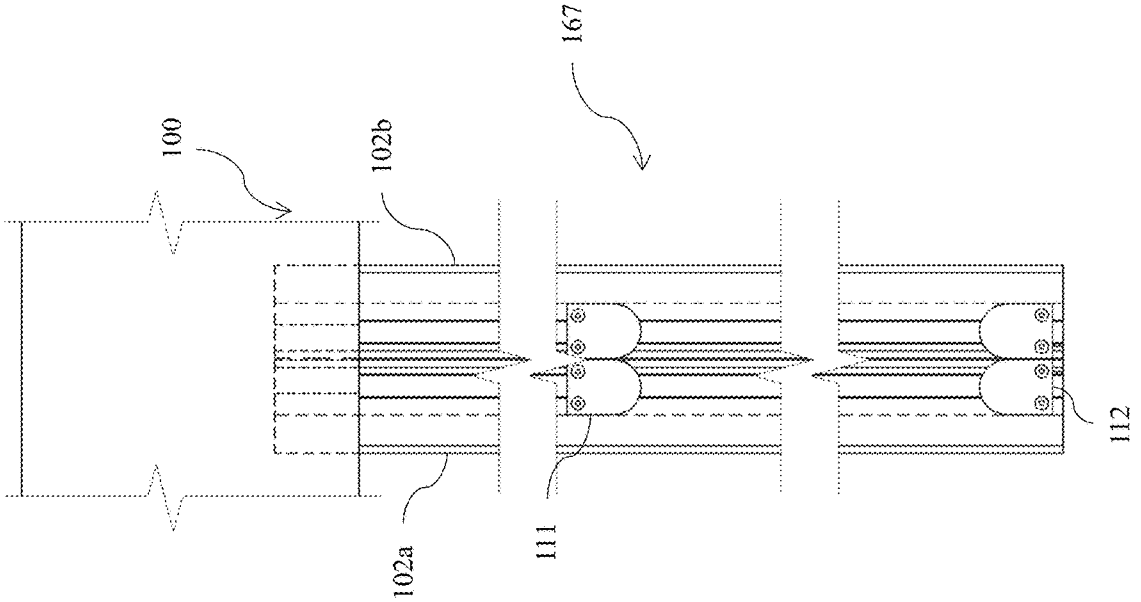
FIG. 5 is a close-up view of the retractable shutter and screen system from the interior of the balcony, according to an embodiment.

FIG. 5 is a close-up interior view of the retractable shutter and screen system 100 showing an assembly 167 comprising the first and second instances 102*a*, 102*b* of the vertical extrusions are arranged back-to-back. Also shown are a pair of top brackets 111 and a pair of bottom brackets 112. These brackets securely hold the glass panel in a vertical orientation behind the vertical extrusion 102, providing structural stability and protection.

Figure 6:
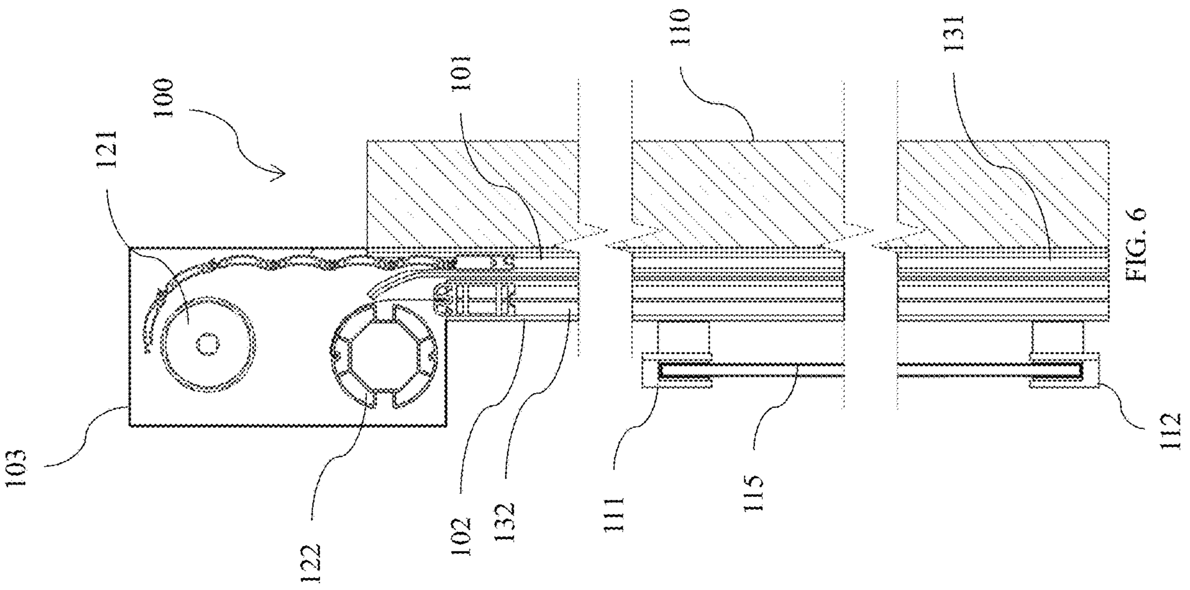
FIG. 6 is a side cross-sectional view in close-up of the retractable shutter and screen system for a balcony, according to an embodiment.

FIG. 6 is a side cross-sectional view in close-up of the retractable shutter and screen system 100 clearly depicting the orientation of extrusions 101 and 102 behind the structural support 110. The relative arrangement of tracks 131 and 132 for guiding shutter and screen materials respectively, along with top and bottom brackets (111, 112) supporting glass panel 115, are highlighted. Further shown are the internal rollers (121, 122) contained within box structure 103. Roller 121 stores shutter material, and roller 122 stores screen material, both deployable downwardly through their respective tracks (131, 132).

Figure 7:
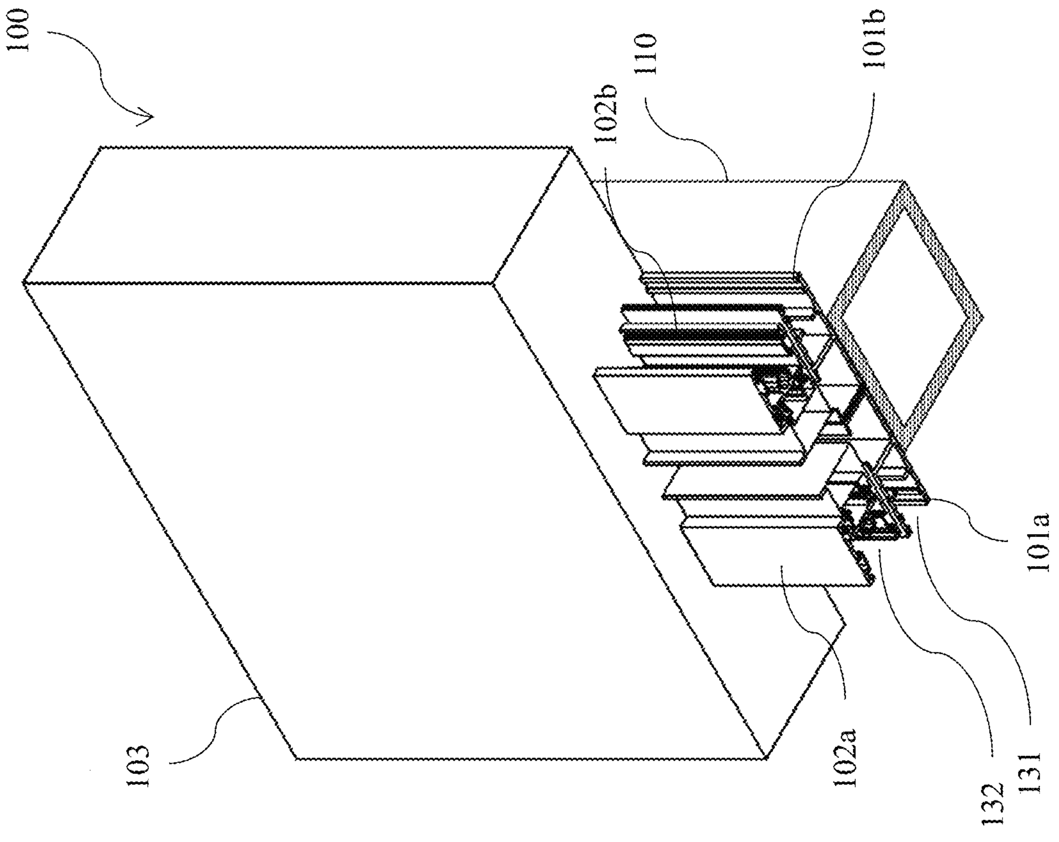
FIG. 7 is a bottom perspective view of the retractable shutter and screen system with a cross-section taken in a transverse plane, according to an embodiment.

FIG. 7 is a bottom perspective cross-sectional view of the retractable shutter and screen system 100 illustrating the box structure 103 at the top of the system. Also shown are the first and second instances 101*a*, 101*b* of the vertical extrusions 101 arranged back-to-back and the first and second instances 102*a*, 102*b* of the vertical extrusions 102 are arranged back-to-back.

Figure 8:
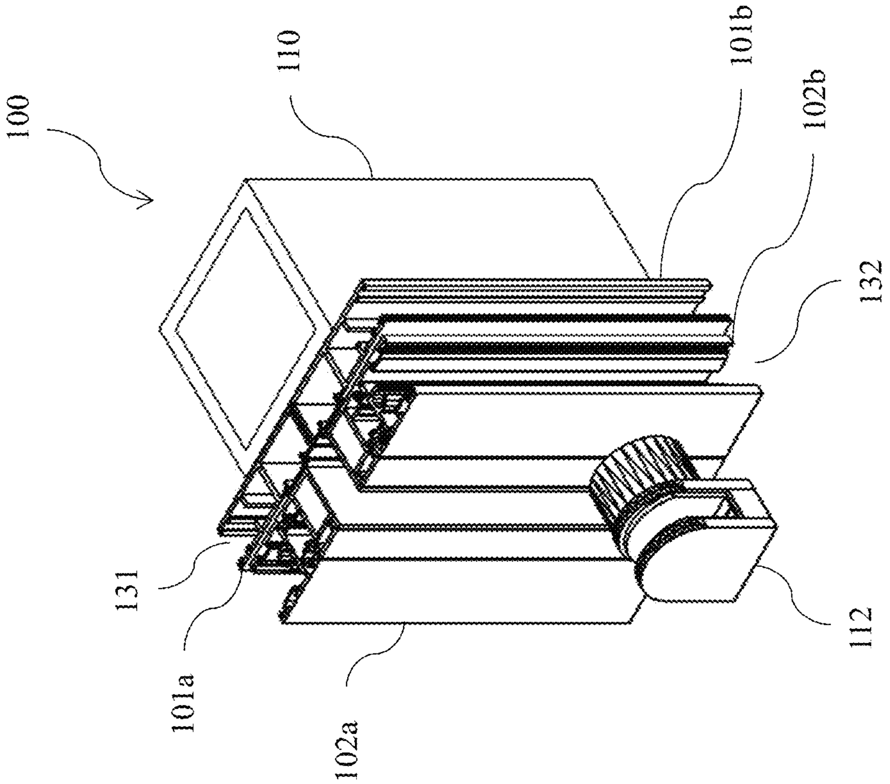
FIG. 8 is a top perspective view of the retractable shutter and screen system with a cross-section taken in a transverse plane, according to an embodiment.

FIG. 8 is a top perspective cross-sectional view of the retractable shutter and screen system 100 illustrating the bottom bracket 112. Also shown are the first and second instances 101*a*, 101*b* of the vertical extrusions 101 arranged back-to-back and the first and second instances 102*a*, 102*b* of the vertical extrusions 102 are arranged back-to-back . . .

Figure 9:
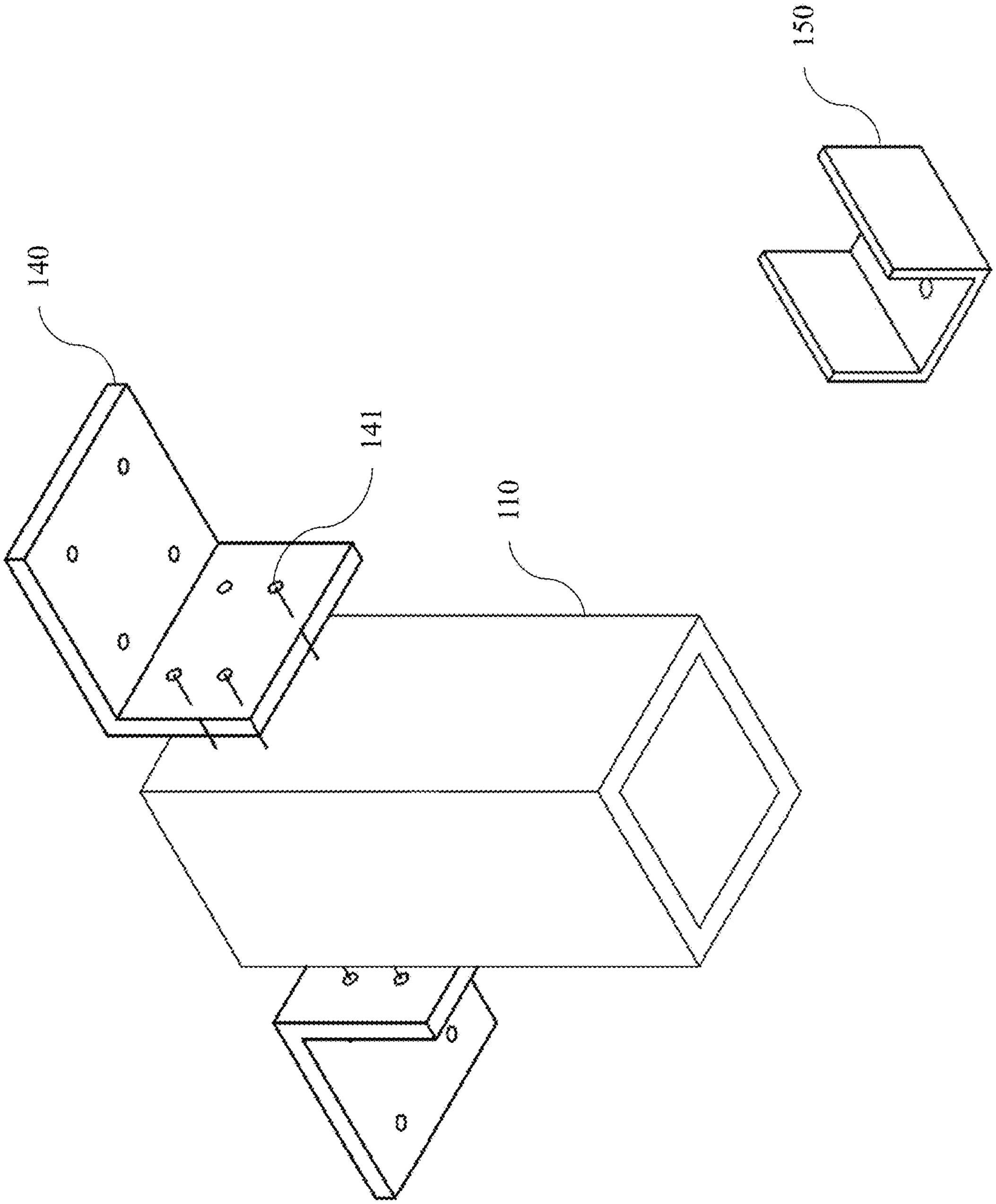
FIG. 9 is a bottom perspective view of the support structure and bottom and top brackets for affixing the support structure to the floor and the ceiling, according to an embodiment.
Figure 10:
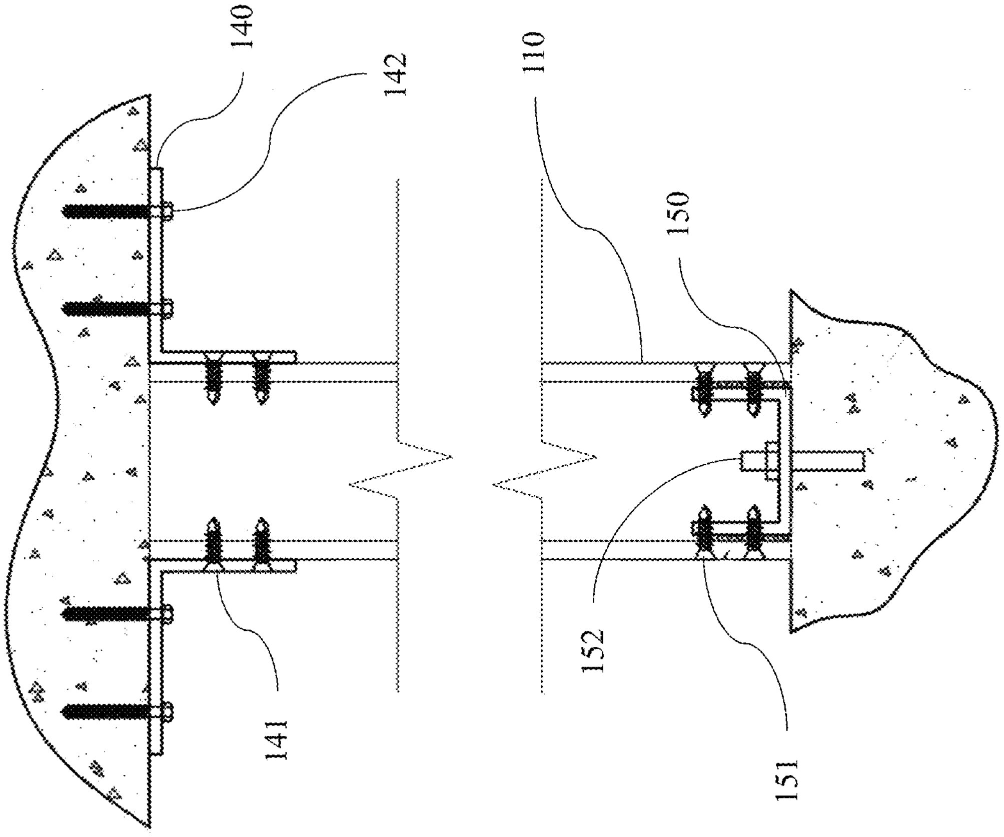
FIG. 10 is a front view of the support structure and bottom and top brackets for affixing the support structure to the floor and the ceiling, with a cross-section taken in a coronal plane, according to an embodiment.

FIGS. 9 and 10 depict the structural support 110, showing how it is secured to the floor and ceiling by brackets. A lower U-bracket 150 attaches to the bottom end of support 110 using fasteners 151, while additional fasteners 152 attach U-bracket 150 securely to the floor. A top L-bracket 140 secures the upper end of support 110 with fasteners 141, and fasteners 142 secure the L-bracket 140 to the ceiling, ensuring structural rigidity. In this manner, the support 110 is vertically stabilized between the floor and ceiling.

Figure 11:
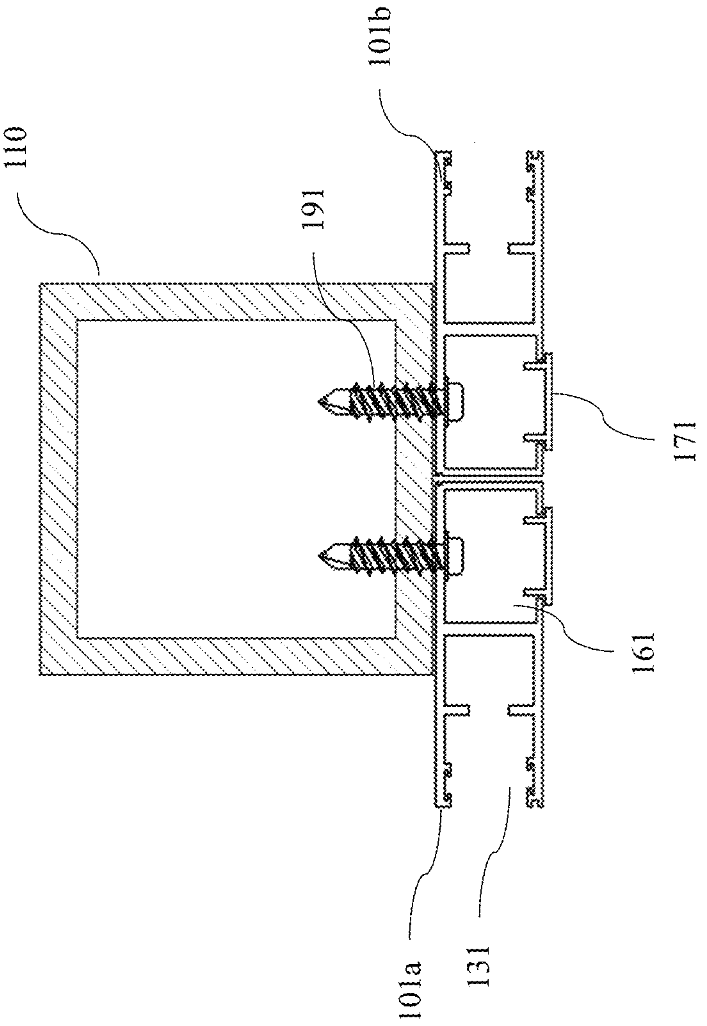
FIG. 11 is a top cross-sectional view of the support structure and two instances of the first vertical extrusion oriented back-to-back, including the fasteners that affix the first vertical extrusions to the support structure, according to an embodiment.

FIG. 11 is a top cross-sectional view highlighting two back-to-back instances (101*a* and 101*b*) of the first vertical extrusion 101, positioned behind structural support 110. Each extrusion 101 has openings 161 for fasteners 191 that securely attach the extrusion 101 to support 110. Said openings may be rectangular in nature and configured to accommodate the fastener 191, in addition to other fasteners 192 and 193, as described below. Covers 171 conceal these fastener openings, enhancing appearance.

Figure 12:
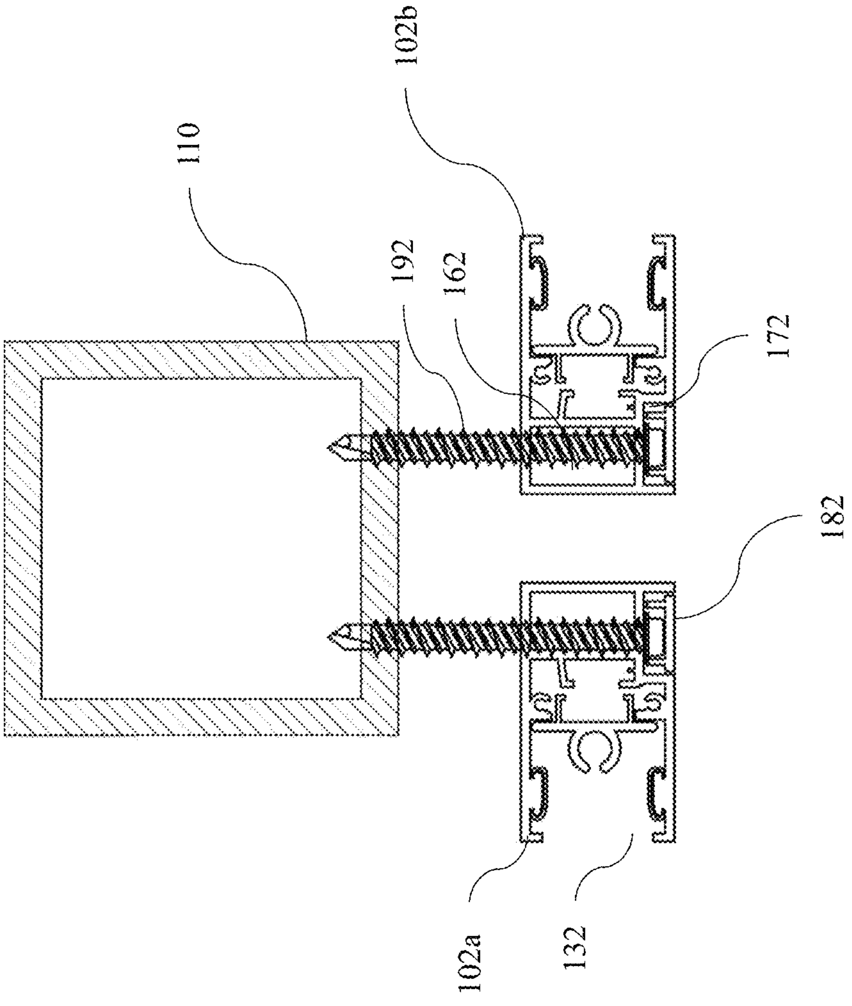
FIG. 12 is a top cross-sectional view of the support structure and two instances of the second vertical extrusion oriented back-to-back, including the fasteners that affix the second vertical extrusions to the support structure, according to an embodiment.

FIG. 12 similarly depicts two instances (102*a* and 102*b*) of second vertical extrusion 102 arranged back-to-back. Extrusions 102 contain openings 162 and 172 for receiving fasteners 192, securing second vertical extrusions 102 through first vertical extrusions 101 and into structural support 110. Said openings 162 and 172 may be rectangular in nature and configured to accommodate the fastener 192, in addition to other fasteners 193, as described below. Covers 182 conceal openings 172. Note that the opening 172 may be rectangular and arranged such that it provides a recess for the head of fastener 192, and such that is allows a cover 182 to conceal the head of fastener 192. As a consequence, opening 162 must be recessed far back enough into the extrusion 102 such that opening 172 itself provides a recess for fastener 192.

Figure 13:
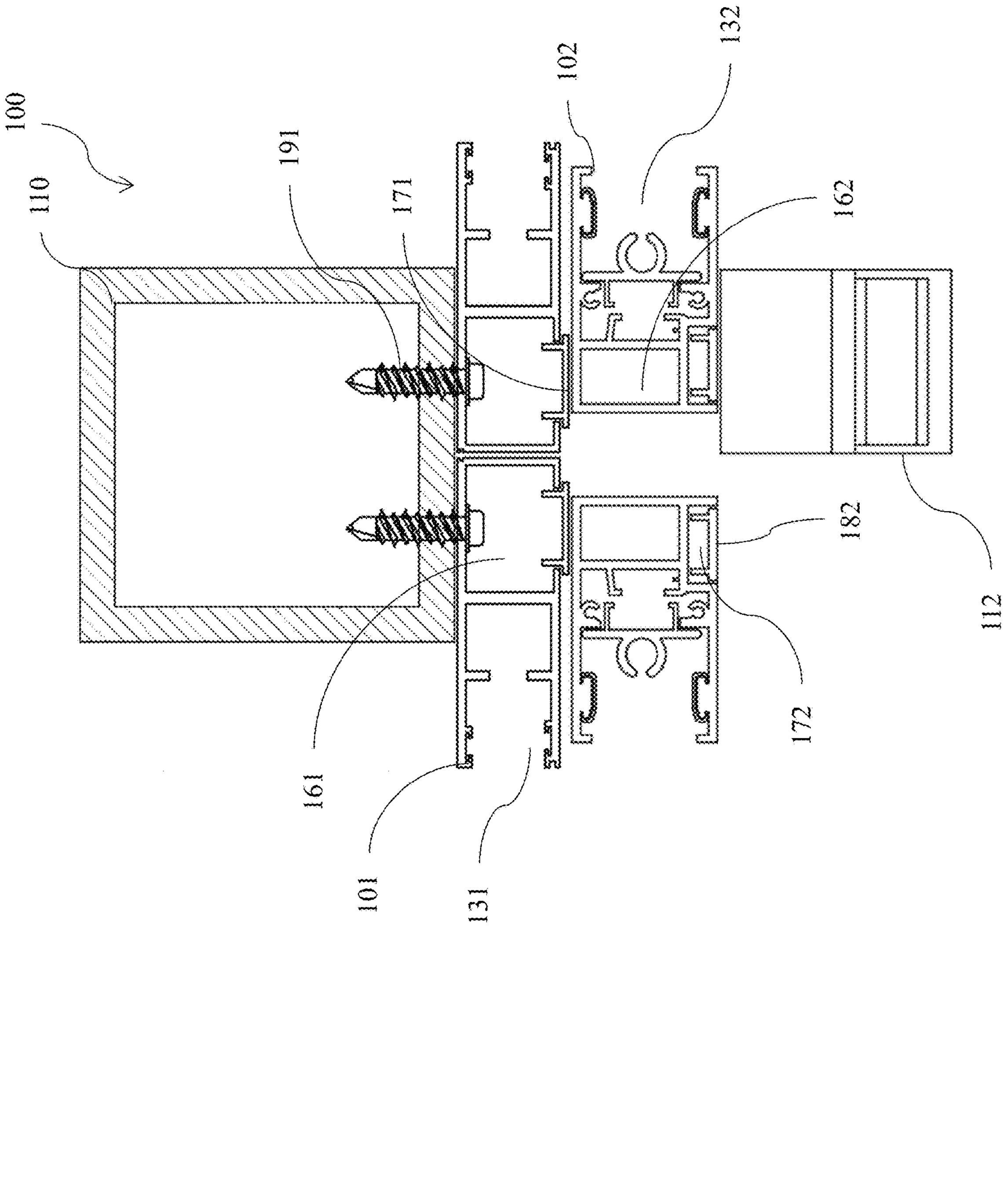
FIG. 13 is a top cross-sectional view of the entire retractable shutter and screen system for a balcony, including the fasteners that affix the first vertical extrusions to the support structure, according to an embodiment.

FIG. 13 illustrates a top cross-sectional view of the assembled system 100, clearly showing fasteners 191 extending through openings 161 of the vertical extrusion 101, securely attaching the extrusion directly to the structural support 110. Covers 171 conceal these openings, maintaining aesthetic integrity.

Figure 14:
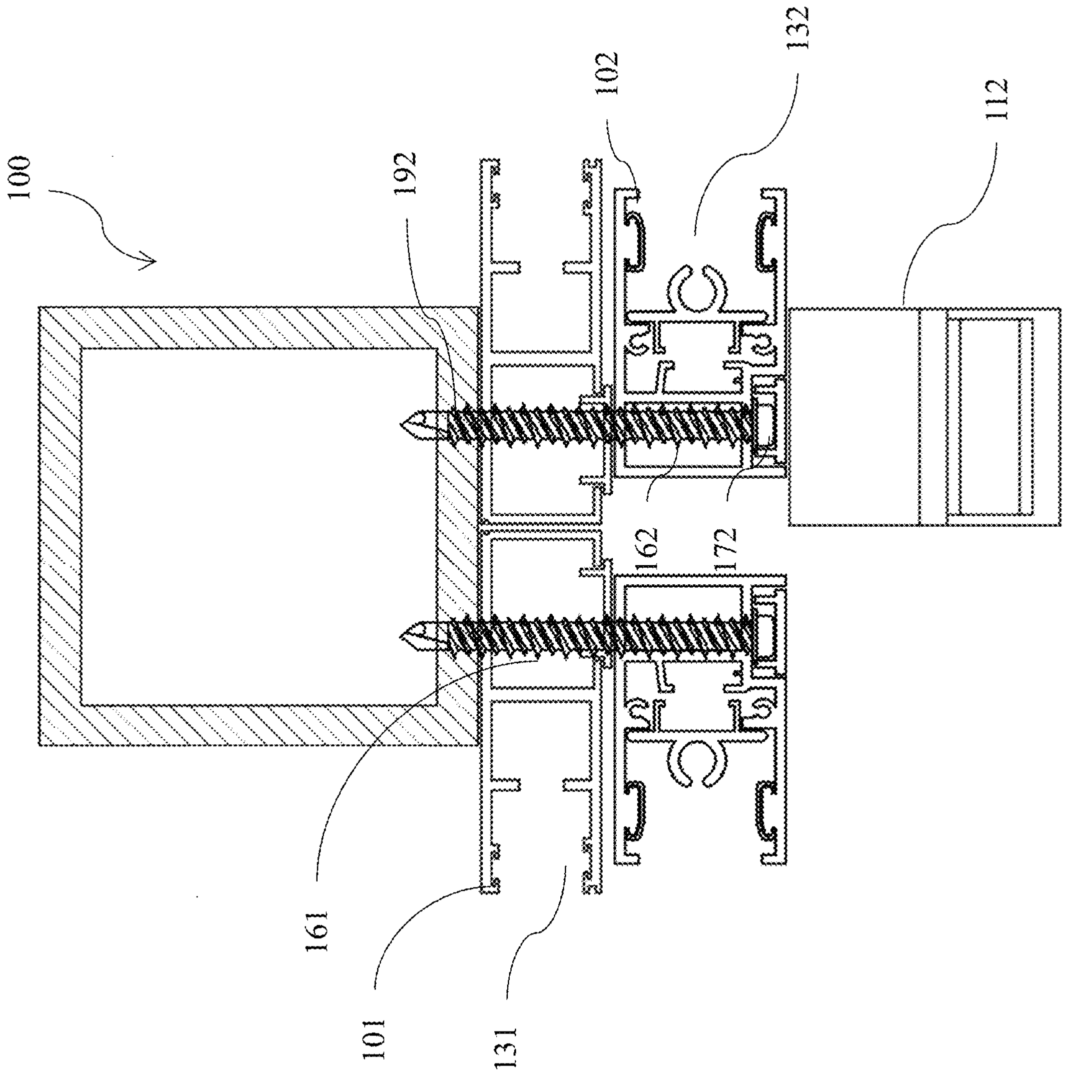
FIG. 14 is a top cross-sectional view of the entire retractable shutter and screen system for a balcony, including the fasteners that affix the second vertical extrusions to the support structure, according to an embodiment.

FIG. 14 provides another top cross-sectional view, illustrating fasteners 192 extending through openings 162, 172 in the second vertical extrusion 102 and opening 161 in the first vertical extrusion 101, securely anchoring extrusion 102 to the structural support 110. Covers 182 conceal openings 172.

Figure 15:
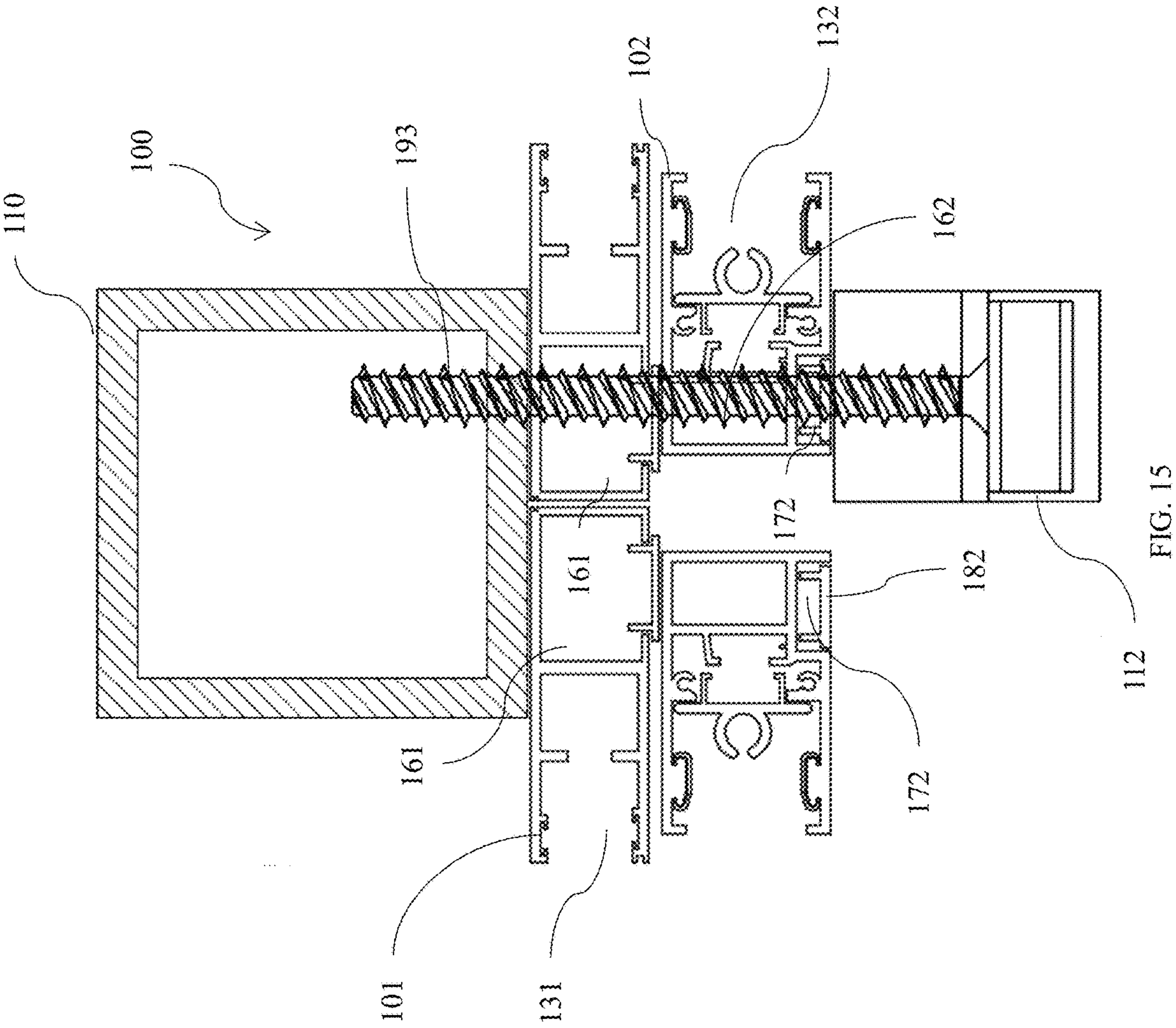
FIG. 15 is a top cross-sectional view of the entire retractable shutter and screen system for a balcony, including the fastener that affixes the panel-supporting brackets to the support structure, according to an embodiment.

FIG. 15 depicts the top cross-sectional view illustrating how fasteners 193 extend through openings (162, 172, and 161) in extrusions 102 and 101 to attach bottom bracket 112 securely to structural support 110, ensuring robust support for bracket 112, and, by extension, glass panel 115.

Figure 16:
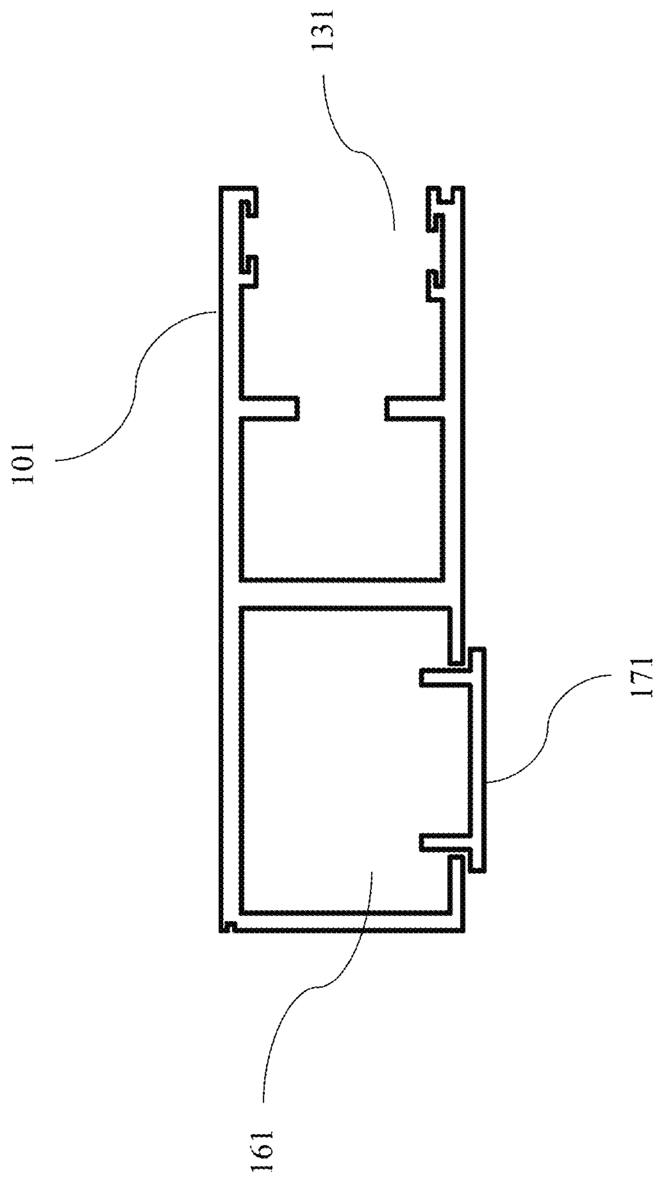
FIG. 16 is a top cross-sectional view of the first vertical extrusion, according to an embodiment.

FIG. 16 provides a detailed top cross-sectional view of the first vertical extrusion 101 alone, clearly showing its internal structure, including track 131 for guiding shutter material, hollow opening 161 for fastener access, and cover 171 for concealing these openings. Extrusion 101 may be fabricated from materials such as extruded aluminum or other corrosion-resistant metals or polymers.

Figure 17:
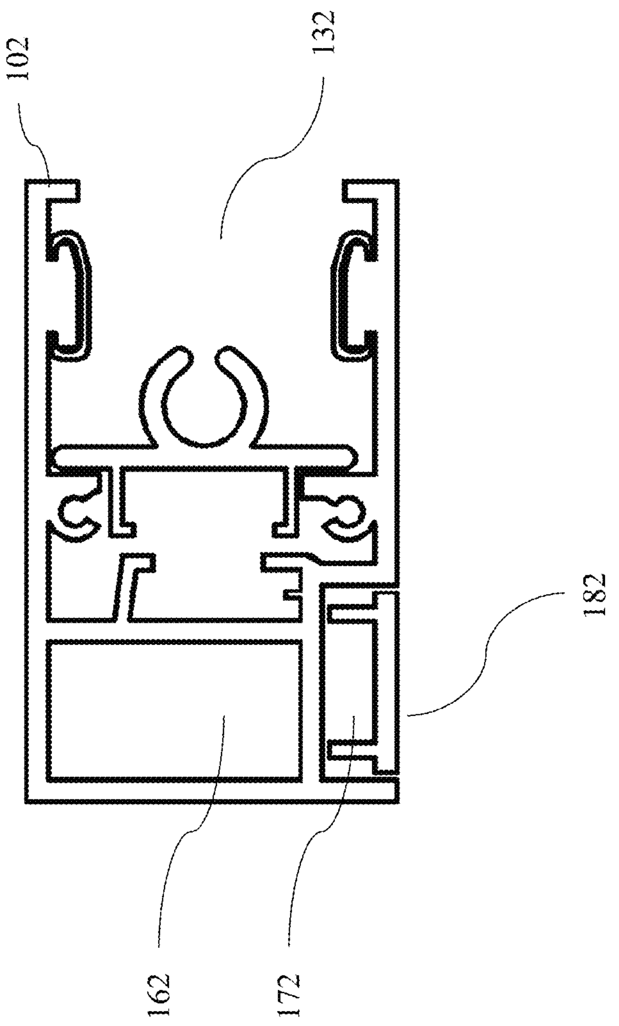
FIG. 17 is a top cross-sectional view of the second vertical extrusion, according to an embodiment.

FIG. 17 similarly provides a detailed top cross-sectional view of the second vertical extrusion 102, clearly illustrating internal track 132 for guiding screen material, hollow fastener openings 162 and 172, and the corresponding cover 182. Like extrusion 101, extrusion 102 may also be made from extruded aluminum, steel, or reinforced polymer material suitable for outdoor exposure.

In general, the structural supports 110 may be square cross-sectional elongated posts fabricated from corrosion-resistant materials such as aluminum or steel to withstand outdoor conditions. The brackets (111, 112, 140, and 150) and associated fasteners (141, 142, 151, 152, 191, 192, 193) may also be constructed of metal, such as stainless steel, aluminum, or another suitably robust and corrosion-resistant material. The enclosure panel 115 preferably comprises impact-resistant laminated glass designed for outdoor structural use. The rollers 121 and 122 within box structure 103 are typically fabricated of aluminum and include mechanisms such as springs or motors to facilitate easy deployment and retraction of the shutter and screen materials. Shutter and screen materials themselves may be composed of durable, weather-resistant fabric or mesh, metal (such as aluminum), reinforced polymer, or composite materials selected for strength, durability, and resistance to storm-driven projectiles.

The arrangement of these components, as shown and described with reference to FIGS. 1-17, ensures comprehensive protection of balcony structures from severe weather, provides effective insect screening, and maintains high aesthetic standards and ease of operation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A retractable shutter and screen system for a balcony, comprising:

a horizontal box structure located adjacent to a ceiling of the balcony, said horizontal box structure containing a rollable shutter material and a rollable screen material;

a plurality of assemblies positioned at an outermost portion of the balcony underneath the horizontal box structure, wherein each assembly comprises:

a) a vertically oriented support structure;

b) a first vertical extrusion positioned directly inward of the support structure, the first vertical extrusion comprising a first vertical track configured to receive and guide the shutter material as the shutter material is deployed downwardly from the horizontal box structure, wherein the first vertical extrusion further comprises a fastening vertical track having opposing sidewalls and at least one opening extending through the fastening vertical track;

c) a second vertical extrusion positioned directly inward of the first vertical extrusion, the second vertical extrusion comprising a second vertical track configured to receive and guide the screen material as the screen material is deployed downwardly from the horizontal box structure, wherein the second vertical extrusion further comprises a fastening vertical track having opposing sidewalls and at least one opening extending through the fastening vertical track;

d) an enclosure panel positioned directly inward of the second vertical extrusion;

e) one or more brackets mounted directly inward of the second vertical extrusion, said brackets configured to engage and support the enclosure panel; and f) at least one fastener extending through the opening in the fastening vertical track of the second vertical extrusion, through the opening in the fastening vertical track of the first vertical extrusion, and into the support structure to secure both the first vertical extrusion and the second vertical extrusion to the support structure.

2. The retractable shutter and screen system of claim 1, wherein the support structure comprises a square cross-sectioned elongated post.

3. The retractable shutter and screen system of claim 2, wherein the fastening vertical track of the first vertical extrusion has sidewalls oriented perpendicular to the first vertical track, said fastening vertical track of the first vertical extrusion being configured for allowing one or more fasteners to extend therethrough.

4. The retractable shutter and screen system of claim 3, wherein the fastening vertical track of the second vertical extrusion has sidewalls oriented perpendicular to the second vertical track, said fastening vertical track of the second vertical extrusion being configured for allowing one or more fasteners to extend therethrough.

5. The retractable shutter and screen system of claim 4, wherein the enclosure panel comprises a glass panel.

6. The retractable shutter and screen system of claim 5, wherein the one or more brackets comprise an upper bracket configured to engage and support an upper edge of the enclosure panel, and a lower bracket configured to engage and support a lower edge of the enclosure panel.

7. The retractable shutter and screen system of claim 6, further comprising at least one fastener that extends through the one or more brackets, through the fastening vertical track in the first extrusion, and through the fastening vertical track in the second extrusion and into the support structure to attach the one or more brackets to the support structure.

8. The retractable shutter and screen system of claim 6, further comprising at least one L-bracket that secures the support structure to the ceiling.

9. A retractable shutter and screen system for a balcony, comprising:

a horizontal box structure located adjacent to a ceiling of the balcony, said horizontal box structure containing a rollable shutter material and a rollable screen material;

a first and a second assembly positioned at an outermost portion of the balcony underneath the horizontal box structure, wherein each assembly comprises:

a) a vertically oriented support structure;

b) a first vertical extrusion positioned directly inward of the support structure, the first vertical extrusion comprising a first vertical track configured to receive and guide the shutter material as the shutter material is deployed downwardly from the horizontal box structure, wherein the first vertical track of the first assembly faces toward and is oriented opposite to the first vertical track of the second assembly, such that the shutter material is retained between the first vertical tracks when deployed, wherein the first vertical extrusion further comprises a fastening vertical track having opposing sidewalls and at least one opening extending through the fastening vertical track;

c) a second vertical extrusion positioned directly inward of the first vertical extrusion, the second vertical extrusion comprising a second vertical track configured to receive and guide the screen material as the screen material is deployed downwardly from the horizontal box structure, wherein the second vertical track of the first assembly faces toward and is oriented opposite to the second vertical track of the second assembly, such that the screen material is retained between the second vertical tracks when deployed, wherein the second vertical extrusion further comprises a fastening vertical track having opposing sidewalls and at least one opening extending through the fastening vertical track;

d) an enclosure panel positioned directly inward of the second vertical extrusion;

e) one or more brackets mounted directly inward of the second vertical extrusion, said brackets configured to engage and support the enclosure panel; and f) at least one fastener extending through the opening in the fastening vertical track of the second vertical extrusion, through the opening in the fastening vertical track of the first vertical extrusion, and into the support structure to secure both the first vertical extrusion and the second vertical extrusion to the support structure.

10. The retractable shutter and screen system of claim 9, wherein the support structure comprises a square cross-sectioned elongated post.

11. The retractable shutter and screen system of claim 10, wherein the fastening vertical track of the first vertical extrusion has sidewalls oriented perpendicular to the first vertical track, said fastening vertical track of the first vertical extrusion being configured for allowing one or more fasteners to extend therethrough.

12. The retractable shutter and screen system of claim 11, wherein the fastening vertical track of the second vertical extrusion has sidewalls oriented perpendicular to the second vertical track, said fastening vertical track of the second vertical extrusion being configured for allowing one or more fasteners to extend therethrough.

13. The retractable shutter and screen system of claim 12, wherein the enclosure panel comprises a glass panel.

14. The retractable shutter and screen system of claim 13, wherein the one or more brackets comprise an upper bracket configured to engage and support an upper edge of the enclosure panel, and a lower bracket configured to engage and support a lower edge of the enclosure panel.

15. The retractable shutter and screen system of claim 14, further comprising at least one fastener that extends through the one or more brackets, through the fastening vertical track in the first extrusion, and through the fastening vertical track in the second extrusion and into the support structure to attach the one or more brackets to the support structure.

16. A retractable shutter and screen system for a balcony, comprising:

a horizontal box structure located adjacent to a ceiling of the balcony, said horizontal box structure containing a rollable shutter material and a rollable screen material;

a plurality of assemblies positioned at an outermost portion of the balcony underneath the horizontal box structure, wherein each assembly comprises:

a) a vertically oriented support structure;

b) a first vertical extrusion positioned directly inward of the support structure, the first vertical extrusion comprising a vertical track oriented in a first direction to receive and guide the shutter material as the shutter material is deployed downwardly from the horizontal box structure, wherein the first vertical extrusion further comprises a fastening vertical track having opposing sidewalls and at least one opening extending through the fastening vertical track;

c) a second vertical extrusion positioned directly inward of the support structure and adjacent to the first vertical extrusion, the second vertical extrusion comprising a vertical track oriented in an opposite direction facing away from the first vertical extrusion, such that the first and second vertical extrusions are arranged back-to-back, wherein the second vertical extrusion further comprises a fastening vertical track having opposing sidewalls and at least one opening extending through the fastening vertical track;

d) a third vertical extrusion positioned directly inward of the first and second vertical extrusions, the third vertical extrusion comprising a vertical track oriented in a first direction to receive and guide the screen material as the screen material is deployed downwardly from the horizontal box structure;

e) a fourth vertical extrusion positioned directly inward of the first and second vertical extrusions and adjacent to the third vertical extrusion, the fourth vertical extrusion comprising a vertical track oriented in an opposite direction facing away from the third vertical extrusion, such that the third and fourth vertical extrusions are arranged back-to-back;

f) an enclosure panel positioned directly inward of the third and fourth vertical extrusions;

g) one or more brackets mounted directly inward of the third and fourth vertical extrusions, said brackets configured to engage and support the enclosure panel; and h) at least one fastener extending through the opening in the fastening vertical track of the second vertical extrusion, through the opening in the fastening vertical track of the first vertical extrusion, and into the support structure to secure both the first vertical extrusion and the second vertical extrusion to the support structure.

* * * * *